United States Patent [19]

Fuhrmann

[11] 4,317,433

[45] Mar. 2, 1982

[54] FLAT-FACED TAPPETS FOR VALVE TRAINS

[75] Inventor: Wolfgang Fuhrmann, Nuremberg, Fed. Rep. of Germany

[73] Assignee: Maschinenfabrik Augsburg-Nürnberg Aktiengesellschaft, Nuremberg, Fed. Rep. of Germany

[21] Appl. No.: 66,614

[22] Filed: Aug. 15, 1979

[30] Foreign Application Priority Data

Aug. 16, 1978 [DE] Fed. Rep. of Germany ....... 2835912

[51] Int. Cl.³ .............................................. F01L 1/16
[52] U.S. Cl. .............................. 123/90.51; 123/90.49; 29/156.7 B
[58] Field of Search ............... 123/90.48, 90.49, 90.51; 74/569; 29/156.7 R, 156.7 B

[56] References Cited

U.S. PATENT DOCUMENTS

| | | | |
|---|---|---|---|
| 1,372,874 | 3/1921 | England | 123/90.49 |
| 1,588,078 | 6/1926 | Windsor | 123/90.49 |
| 1,613,117 | 1/1927 | Miller | 123/90.49 |
| 1,993,473 | 3/1935 | Brackett | 123/90.49 |
| 2,055,341 | 9/1936 | Dyer | 123/90.51 |

Primary Examiner—Charles J. Myhre
Assistant Examiner—W. R. Wolfe
Attorney, Agent, or Firm—Becker & Becker, Inc.

[57] ABSTRACT

Flat-faced tappets, especially for valve trains in reciprocating internal combustion engines, having a shaft with a substantially cup-shaped transmission end adapted to cooperate with other parts of the valve train, a cam follower member of a highly elastic material and a hollow space between the cam follower member and the transmission end allowing resilient deflection of the cam follower member at least in the region in which the cam runs against the cam follower member.

9 Claims, 4 Drawing Figures

FLAT-FACED TAPPETS FOR VALVE TRAINS

This invention relates to flat-faced tappets or cam followers for valve trains in reciprocating engines, especially internal combustion engines, with a cam follower having a shaft, a cam follower member facing the pertaining operating cam, and a substantially cup-shaped transmitting end for cooperating with other valve train components.

A known valve tappet is formed with a hollow shank of casehardened steel to which a contact face of alloy steel is secured. The contact face is intended to present a cam contact-surface of maximum hardness and resistance and for minimizing the frictional resistance.

Such requirements apply generally to all tappets, because limitations are imposed on the size of the cam due to the limited space usually available. As a result, there are especially small radii of curvature at the cam nose and, consequently, high Hertz stresses.

Thus, Hertz stresses are transmitted to the tappet face during every cam rotation and through oil films of varying thickness. This has an important influence on the effects caused due to Hertz stresses in the cam face, since, in the region of the cam nose, i.e. approximately at the center of the tappet face, the lubricant film is thinnest and during every cam rotation, the tappet face is subjected to an impact similar to the blow with the pane of a hammer when the load is transmitted by the cam nose. As a consequence of this, deformations and wear occur in the tappet face in the form of grooves or scoring and pitting. This is reduced by using tappets which are adapted to rotate, but tappet rotation entails other drawbacks.

When the tappet is solid and provided with a layer of a wear-resistant material, e.g. when a boride layer or titanium carbide layer is applied to the contact face, such a layer will be very hard, but it will tend to become brittle after a short period of time causing it to flake off.

This is the starting point of the present invention which has for its object to improve a flat-faced tappet or cam follower in a simple manner so that wear, especially in the form of pitting, is substantially reduced.

This object and other objects and advantages of the invention will appear more clearly from the following specification in connection with the accompanying drawing, in which.

According to one aspect of the invention, the cam follower member or tappet face member is of a highly elastic material and, at least in the region where the cam runs on the tappet, there is provided a hollow space between the cam follower member and the transmitting end of the cam follower shank or shaft rendering the tappet face resilient.

In contrast to the known proposals, it is now suggested to make the cam follower member resilient. This can be achieved by selection of a highly elastic material, preferably tool steel, or by the provision of the hollow space. Such a tappet need not be mounted to permit rotation thereof and such tappets are not expensive, because, aside from the cam follower member, economical materials can be used, possibly including noise-damping properties as required.

The natural frequency of the cam follower member according to one aspect of the invention is selected so that the member will deflect by about 1 micron due to the cam acting at very short peak load.

The embodiments of a cam follower according to the invention may take various forms. For instance, it is proposed in accordance with one aspect of the invention to form the cam follower member as a flat, round plate which is secured, e.g. by electron-beam welding, brazing, or friction welding, to the shaft of the cam follower; this shaft is of less expensive material. The hollow space or air cushion space is formed by a cavity in the lower end of the shaft with the cavity being of desired shape, preferably semi-spherical in shape. The upper end of the shaft serves to provide a transmission surface and, in most cases, cooperates with a push rod.

The face of the cam follower member contacting the cam may also be provided with a raised ring which registers in a corresponding recess of the shaft to simplify welding.

According to another aspect of the invention, it is proposed to make the cam follower member integral with the shank. This can be attained by deep drawing a cup-shaped part, and an insert is then placed into this cup-shaped part. The insert is formed at one end to provide the cavity, and the other end serves as the transmitting surface.

Optionally, the cavity may be adapted to communicate with the corresponding sources by means of vent ports or oil supply ports. In the latter case, oil enters from the camshaft lubrication system. Such arrangement can be useful to abate noise.

In accordance with another embodiment of the invention, the shaft is machined at the side at its end facing the cam follower member, the latter being provided by a flat plate and an upstanding lug, corresponding in shape to the machined cut. This lug is welded to the shaft in a manner such that a gap is provided between the cam follower member and the end of the shaft.

Such a tappet is likely to be most effective, but must be mounted so that it cannot rotate.

Figure 1:
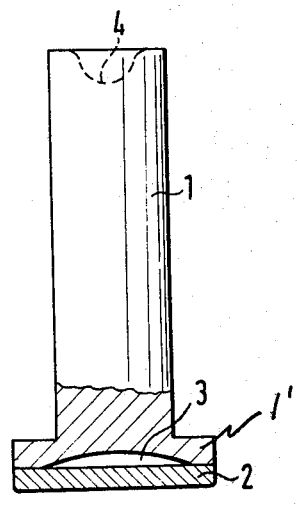
FIG. 1 is a side elevational view, partly in cross section, of one embodiment of a tappet according to the present invention.

Referring particularly to FIG. 1 of the drawing, a mushroomtype flat-faced tappet is shown, which has a solid shaft 1. Shaft 1 at its lower end has a flange portion 1' to which a circular cam follower member 2 of highly elastic material is peripherally secured, e.g. by welding. The cam follower member 2 is contactable by a cam, not shown. Between the central part of the cam follower member 2 and the bottom end of shaft 1 there is provided a holow space 3 formed by a depression in the pertaining surface of flange portion 1'; this hollow space is somewhat in the shape of part of a sphere, or semi-spherical. The upper end of the shaft 1 is provided with a cup-shaped transmission face or depression 4 which cooperates with further valve train parts, especially a push rod, not illustrated. When the cam engages the cam follower member 2, the cam follower member 2 is initially slightly deflected resiliently and reduces the effect of the Hertz stresses.

Figure 2:
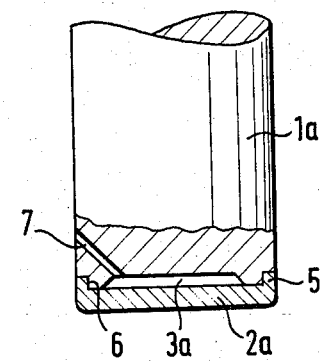
FIG. 2 is a view similar to FIG. 1 showing the lower part of a tappet in accordance with another embodiment of the present invention.

The flat-faced tappet which is shown in FIG. 2 differs from that shown in FIG. 1 in that the hollow space 3a, when viewed in cross section, has the form of a trapezoid and in that the cam follower member 2a is provided with a raised ring 5 which registers in a recess 6 of the shaft 1a. Furthermore, the hollow space 3a is provided with a vent port 7 which may also function as an oil circulation port when the hollow space 3 is filled with oil, so as to attain a damping effect.

Figure 3:
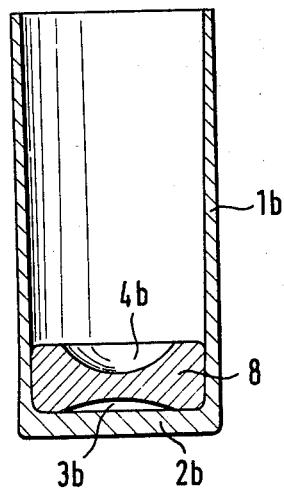
FIG. 3 is a view similar to FIG. 1 of yet another embodiment of a tappet in accordance with the present invention.

The tappet illustrated in FIG. 3 includes a cam follower member 2b, i.e. a cup-shaped part made, for example, by deep drawing and having a hollow cylindrical portion 1b. An insert 8 is placed and welded into the cup-shaped part, the bottom end of the insert 8 forming the hollow space 3b and its upper end forming the transmission face 4b.

Figure 4:
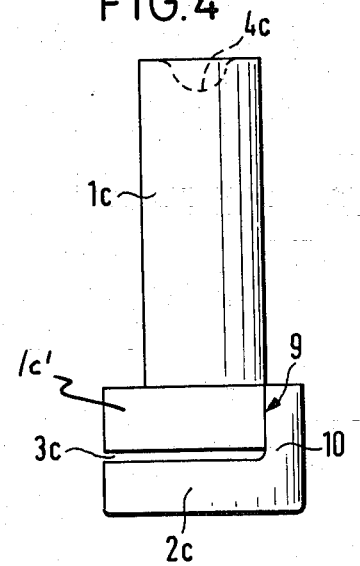
FIG. 4 is a side elevational view of still another embodiment of a tappet in accordance with the present invention.

FIG. 4 shows another variant of a tappet. This tappet is also of the mushroom-type, and the shaft 1c thereof is formed with a flange portion 1c' at the end facing the cam follower member 2c. A portion of flange portion 1c' is machined off to provide a plane 9. The cam follower member 2c includes a flat plate portion and a lug 10 upstanding from the plate portion. The lug 10 complements the truncation in flange portion 1c' and, by means of this lug 10, the cam follower member 2c is welded to the flange portion 1c' in the manner such that a gap 3c is formed between the flange portion 1c' of shaft 1c and the cam follower member 2c. The gap 3c is adapted to deflect resiliently and to reduce the effect of Hertz stresses.

It is not necessary to secure the tappets according to FIGS. 1–3 to prevent turning thereof. However, the tappet according to FIG. 4 requires means, not shown, to prevent turning therof.

It may be mentioned here that the thickness of the cam follower members in the embodiments shown in FIGS. 1–3 is from about 1 to about 4 mm, depending on the width of the hollow spaces, whereas the thickness of the cam follower member 2c of FIG. 4 is approximately 10 mm.

The present invention is, of course, in no way restricted to the specific disclosure of the specification and drawing, but also encompasses any modifications within the scope of the appended claims.

What I claim is:

1. A flat-faced tappet, especially for valve trains in reciprocating internal combustion engines, said tappet comprising in combination:
   a shaft having a first upper end that cooperates with valve components belonging therewith, and a second lower end remote from said first end; and
   a cam follower member of highly elastic material operatively connectible to said shaft at said second end thereof, a hollow space being provided only between said cam follower member and said second lower end of said shaft for allowing deflection of said cam follower member, the highly elastic material of said cam follower member at least at that portion which is contactable directly by a cam belonging therewith being made of a highly elastic tool steel.

2. A tappet in combination according to claim 1, wherein said cam follower member comprises a flat round plate connected by welding to said shaft, and wherein said hollow space is a semi-spherical recess in said shaft at said second end thereof.

3. A tappet in combination according to claim 1, wherein the shape of said hollow space conforms to the shape of said tappet and has any suitable configuration.

4. A tappet according to claim 1, wherein said shaft includes a circumferential recess at said second end and wherein said cam follower member has an annular projection adapted to register in said recess in said shaft, said hollow space being provided between said cam follower member and said second end of said shaft.

5. A tappet according to claim 1, wherein said cam follower member is a cup-shaped member made by deep drawing and wherein said shaft is an insert secured in said cup-shaped member, said insert having at its second end said hollow space and at its first end a transmitting space adapted to cooperate with pertaining valve components.

6. A tappet according to claim 1, wherein said tappet includes vent ports leading to said hollow space.

7. A tappet according to claim 1, wherein said tappet includes oil circulation ports leading to said hollow space.

8. A tappet according to claim 1, wherein said cam follower member is a flat plate with a projecting lug, said lug being adapted to be operatively secured to said second end of said shaft by welding in such a way so as to form a gap which provides said hollow space between said cam follower member and said second end of said shaft.

9. A tappet in combination according to claim 1, wherein the natural frequency of said cam follower member is selected in a way such that said cam follower member is resiliently deflected by a cam of said valve train belonging therewith through a distance of about 1 micron during short peak load.

* * * * *